United States Patent
Kawka

(10) Patent No.: US 8,967,331 B2
(45) Date of Patent: Mar. 3, 2015

(54) MULTILAYERED SHEET

(71) Applicant: Dariusz Wlodzimierz Kawka, Midlothian, VA (US)

(72) Inventor: Dariusz Wlodzimierz Kawka, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 207 days.

(21) Appl. No.: 13/692,214

(22) Filed: Dec. 3, 2012

(65) Prior Publication Data

US 2013/0156984 A1   Jun. 20, 2013

Related U.S. Application Data

(60) Provisional application No. 61/570,544, filed on Dec. 14, 2011.

(51) Int. Cl.
| | | |
|---|---|---|
| *E04B 1/84* | (2006.01) | |
| *B32B 3/00* | (2006.01) | |
| *B32B 3/10* | (2006.01) | |
| *B32B 7/02* | (2006.01) | |
| *B32B 7/06* | (2006.01) | |
| *B32B 7/12* | (2006.01) | |
| *B32B 7/14* | (2006.01) | |
| *B32B 9/00* | (2006.01) | |
| *B32B 33/00* | (2006.01) | |
| *B32B 27/12* | (2006.01) | |
| *B64C 1/40* | (2006.01) | |
| *C08K 3/34* | (2006.01) | |
| *C08K 5/541* | (2006.01) | |

(Continued)

(52) U.S. Cl.
CPC . *B32B 7/06* (2013.01); *B32B 27/12* (2013.01); *B32B 7/12* (2013.01); *B64C 1/40* (2013.01); *B32B 7/14* (2013.01); *C08K 3/346* (2013.01); *C08K 5/541* (2013.01); *C08K 7/10* (2013.01); *C08K 7/12* (2013.01); *D21H 27/001* (2013.01); *D21H 17/63* (2013.01); *D21H 19/10* (2013.01); *D21H 19/72* (2013.01); *D21H 21/14* (2013.01); *B32B 2307/3065* (2013.01); *B32B 2605/18* (2013.01); *B32B 2307/102* (2013.01)
USPC .......... 181/294; 428/41.8; 428/138; 428/189; 428/212; 428/213; 428/216; 428/341

(58) Field of Classification Search
CPC .............. B32B 7/06; B32B 7/12; B32B 7/14; B32B 27/12; B32B 2307/3065; B32B 2307/102; B32B 2605/18; B64C 1/40
USPC .......... 181/294; 428/138, 212, 213, 216, 41.8, 428/341, 189
See application file for complete search history.

(56) References Cited

U.S. PATENT DOCUMENTS 3,346,219 A * 10/1967 Salyer et al. .............. 244/114 R
3,533,822 A * 10/1970 Bailey ........................... 428/202
(Continued)

FOREIGN PATENT DOCUMENTS

WO    WO 2007/130417    11/2007

*Primary Examiner* — David Warren
*Assistant Examiner* — Christina Schreiber
(74) *Attorney, Agent, or Firm* — Andrew G. Golian

(57) ABSTRACT

This invention is directed to a multilayered sheet comprising a release paper and an inorganic refractory layer coated onto one surface of the release paper wherein the refractory layer has a dry areal weight of from 15 to 50 gsm and a residual moisture content of no greater than 10 percent by weight. The paper comprises a blend of cellulose and cotton fibers and is hydrophilic.

12 Claims, 1 Drawing Sheet

(51) Int. Cl.
*C08K 7/10* (2006.01)
*C08K 7/12* (2006.01)
*D21H 27/00* (2006.01)
*D21H 17/63* (2006.01)
*D21H 19/10* (2006.01)
*D21H 19/72* (2006.01)
*D21H 21/14* (2006.01)

(56) References Cited

U.S. PATENT DOCUMENTS

| | | | | |
|---|---|---|---|---|
| 3,841,954 A | * | 10/1974 | Lawler | 28/102 |
| 3,929,270 A | * | 12/1975 | Keith | 228/50 |
| 4,810,565 A | * | 3/1989 | Wasitis et al. | 428/215 |
| 5,336,348 A | * | 8/1994 | Mindler | 156/231 |
| 5,368,950 A | * | 11/1994 | Kokuta et al. | 428/704 |
| 5,667,886 A | * | 9/1997 | Gough et al. | 428/331 |
| 6,322,022 B1 | * | 11/2001 | Fay et al. | 244/121 |
| 6,565,040 B2 | * | 5/2003 | Fay et al. | 244/121 |
| 6,627,561 B1 | * | 9/2003 | Wulliman et al. | 442/1 |
| 6,670,291 B1 | * | 12/2003 | Tompkins et al. | 442/136 |
| 8,080,297 B2 | * | 12/2011 | Kravitz et al. | 428/36.6 |
| 2004/0211506 A1 | * | 10/2004 | Wang et al. | 156/89.11 |
| 2006/0046598 A1 | * | 3/2006 | Shah | 442/394 |
| 2007/0155265 A1 | * | 7/2007 | Anderson | 442/35 |
| 2010/0024969 A1 | * | 2/2010 | Wang et al. | 156/239 |
| 2010/0209679 A1 | * | 8/2010 | Tompkins | 428/201 |
| 2011/0094826 A1 | * | 4/2011 | Richardson et al. | 181/294 |
| 2011/0114342 A1 | * | 5/2011 | Ono et al. | 169/45 |
| 2012/0003451 A1 | * | 1/2012 | Weigel et al. | 428/213 |
| 2012/0128959 A1 | * | 5/2012 | Fernando et al. | 428/219 |
| 2012/0321848 A1 | * | 12/2012 | Richardson, III et al. | 428/138 |
| 2012/0321849 A1 | * | 12/2012 | Richardson et al. | 428/138 |
| 2012/0321868 A1 | * | 12/2012 | Richardson et al. | 428/216 |
| 2012/0321883 A1 | * | 12/2012 | Richardson et al. | 428/341 |

* cited by examiner

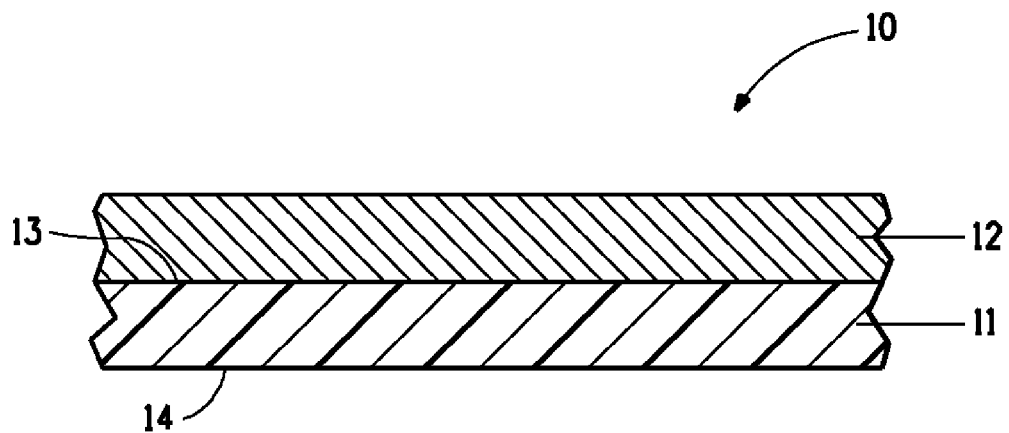

MULTILAYERED SHEET

BACKGROUND OF THE INVENTION

1. Field of Invention

This invention pertains to a multilayered sheet comprising a carrier layer and an inorganic refractory layer. The carrier layer is a paper.

2. Background of the Invention

U.S. Pat. No. 6,322,022 to Fay et al. discloses burnthrough resistant systems for transportation especially aircraft.

U.S. Pat. No. 6,670,291 to Tomkins and Vogel-Martin describes a laminate sheet material for flame barrier applications.

U.S. Pat. No. 5,667,886 to Gough et al describes a composite sheet having a substrate layer, a coating layer and a flexible adhesive layer. The substrate layer is preferably a polyester film. The coating layer contains a mineral, preferably vermiculite.

There remains an ongoing need for methods to provide a thin inorganic refractory layer in a form that may be safely handled and subsequently processed into a multi layer composite for use as a flame barrier component in a thermal and acoustic blanket for aircraft structures.

SUMMARY OF INVENTION

This invention pertains to a multilayered sheet comprising a release paper having a first and a second outer surface and an inorganic refractory layer adjacent to at least one surface of the release paper wherein the refractory layer has a dry areal weight of from 15 to 50 gsm and a residual moisture content of no greater than 10 percent by weight, wherein the release paper (i) comprises a blend of cellulose and cotton fibers,
(ii) is hydrophilic
(iii) has a wet tensile strength of at least 5 lb/in in a first direction and at least 2 lb/in in a second direction, the second direction being transverse to the first direction,
(iv) has a dry tensile strength of at least 10 lb/in in a first direction and at least 5 lb/in in a second direction, the second direction being transverse to the first direction,
(v) has a surface smoothness on at least one outer surface of no greater than 150 Sheffield units,
(vi) has a surface release value from at least one outer surface of from 0.25 to 1.5 lb/in,
(vii) has a thickness of from 5 to 12 mil,
(viii) has a density of from 0.9 to 1.1 g/cc, and
(ix) has an air permeability no greater than 1200 Gurley Air Resistance (sec/100cc, 20 oz. cyl.).

BRIEF DESCRIPTION OF DRAWINGS

FIG. 1 is a schematic cross section through a multilayered sheet of this invention.

DETAILED DESCRIPTION OF THE INVENTION

FIG. 1 shows a section through a multilayered sheet 10 comprising a carrier or substrate layer 11 and an inorganic refractory layer 12 deposited onto the carrier layer. A preferred carrier material is a release paper.

Release Paper

The release paper has a first and a second outer surface shown respectively at 13 and 14 in FIG. 1. The release paper comprises a blend of wood pulp (cellulose) and long staple cotton fiber, in some embodiments the blend comprises from 40 to 60 weight percent of cellulose. In some other embodiments the blend comprises from 45 to 55 weight percent of cellulose.

The paper has a wet tensile strength of at least 5 lb/in in a first direction and at least 2 lb/in in a second direction, the second direction being transverse to the first direction, In a preferred embodiment the first direction is the long direction within the plane of the paper, that is the direction in which the roll of paper has been made. This is also known as the machine direction. The second direction is sometimes known as the cross direction. By wet tensile strength we mean the tensile strength of the paper after saturation with water. If the wet tensile strength is less than 5 lb/in in a first direction, there is a high risk of frequent sheet breaks during the coating process due to the weight being deposited on the paper and the tension applied to the paper.

The paper has a dry tensile strength of at least 10 lb/in in a first direction and at least 5 lb/in in a second direction, the second direction being transverse to the first direction. By dry tensile strength we mean the tensile strength of a paper that has been conditioned at ambient temperature and humidity, typically 48-52% Relative Humidity and 22-24 degrees C. TAPPI T-402 sp-08 is an example specification defining ambient conditions for paper, board and pulp products.

A dry tensile strength of at least 10 lb/in in a first direction is required to ensure proper handling of the coated web through the subsequent process steps, in particular, to ensure tight roll formation during winding to prevent roll sagging and telescoping.

In some embodiments, the release paper has a dry tensile strength of from 60 to 90 lb/in in the first direction and from 20 to 40 lb/in in the second direction.

The paper has a surface smoothness on the outer surface that is in contact with the refractory layer of no greater than 150 Sheffield units, Smoothness is concerned with the surface contour of paper. It is the flatness of the surface under testing conditions which considers roughness, levelness, and compressibility. This test is an indirect measure of paper smoothness or roughness. The Sheffield test method is a measurement of air flow between the test specimen (backed by flat glass on the bottom side) and two pressurized, concentric annular lands that are impressed in to the sample from top. Such a procedure is described in TAPPI T-538 om-08. In some embodiments, the release paper has a surface smoothness on at least one outer surface of from 60 to 80 Sheffield units.

The paper has a surface release value on the outer surface that is in contact with the refractory layer of from 0.25 to 1.5 lb/in, If the release value is less than 0.25 lb/in, the inorganic refractory layer can peel off the release paper with a risk of breaks in the refractory layer. If the release value is greater than 1.5 lb/in, the refractory layer would be difficult to remove from the release paper during subsequent process steps.

The paper is hydrophilic. This feature aids the drying process. As the majority of the water from the refractory coating dispersion is absorbed by the release paper, this allows more efficient drying and forming of the inorganic refractory layer as well as preventing drying defects such as blisters in the refractory layer.

The paper has a thickness of from 5 to 12 mil and a density of from 0.9 to 1.1 g/cc. A paper density of below 0.9 g/cc would result in undesirable features such as a weaker and a more fluffy paper with a rough and fuzzy surface. A paper density of greater than 1.1 g/cc would alter the air permeability of the paper and hinder the drying process of the coated paper. A denser paper could also lead to a more uneven sheet with a less flat surface. A paper thickness below 5 mil would result in undesirable features such as a weaker and less dimensionally stable sheet, especially when saturated with water. A paper thickness of greater than 12 mil would alter the air permeability of the paper and hinder the drying process of the coated paper. A thicker paper could also affect overall process due to excessive weight and stiffness. In some embodiments, the paper has a thickness of from 9 to 11 mil.

The paper has an air permeability no greater than 1200 Gurley Air Resistance (sec/100cc, 20 oz. cyl). An air permeability is greater than 1200 Gurley Air Resistance would adversely affect the drying process of the coated paper In some embodiments, the paper has an air permeability of from 300 to 700 Gurley Air Resistance (sec/100cc, 20 oz. cyl.).

The release paper may further comprise up to 5 weight percent of a dimensional stability promoting additive. Suitable additives include micro-glass, fiberglass, inorganic fibers and other wet strength fibers. A wet strength fiber is a hydrophilic fiber such as polyethylene terephthalate (PET) that does not significantly change its strength and/or dimensional properties when wetted, thus resulting in no loss in overall strength and flatness of a substrate comprising a wet strength fiber when exposed to water.

Preferably the release paper is thermally stable at a temperature of 150 deg C for at least 10 minutes, that is to say, that the paper will not change dimensions when subjected to a temperature of 150 deg C for at least 10 minutes.

Inorganic Refractory Layer

The inorganic refractory layer is adjacent to at least one outer surface of the release paper. The refractory layer has a dry areal weight of from 15 to 50 gsm and a residual moisture content of no greater than 10 percent by weight, In some embodiments, the refractory layer has a dry areal weight of from 20 to 35 gsm and a residual moisture content of no greater than 3 percent by weight. The layer is shown as 12 in FIG. 1.

The refractory layer comprises platelets. Preferably at least 85% of the layer comprises platelets, more preferably at least 90% and most preferably at least 95%. In some embodiments, platelets comprise 100% of the layer. The refractory layer may comprise some residual dispersant arising from incomplete drying of the platelet dispersion during manufacture.

The refractory layer has a thickness of from 7.0 to 76 micrometers and more preferably from 7.0 to 50 micrometers. Preferably, the layer has a UL 94 flame classification of V-0. The function of the refractory layer, in which adjacent platelets overlap, is to provide a flame and hot gas impermeable barrier. The inorganic platelets may be clay, such as montmorillonite, vermiculite, mica, talc and combinations thereof. Preferably, the inorganic oxide platelets are stable (i.e., do not burn, melt or decompose) at about 600 degrees C., more preferably at about 800 degrees C. and most preferably at about 1000 degrees C. Vermiculite is a preferred platelet material. Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets. Suitable vermiculite materials are available from W. R. Grace of Cambridge, Mass., under the trade designations MicroLite 963 and MicroLite HTS-XE.

The thickness of an individual platelet typically ranges from about 5 Angstroms to about 5,000 Angstroms more preferably from about 10 Angstroms to about 4,200 Angstroms. The mean value of the maximum width of a platelet typically ranges from about 10,000 Angstroms to about 30,000 Angstroms. The aspect ratio of an individual platelet typically ranges from 100 to 20,000.

In a preferred embodiment, the refractory layer further comprises cations arising from contact, at a temperature of from 10 to 50 degrees C., with an aqueous cationic rich solution at a cation concentration of from 0.25 to 2N. The contact with the cationic solution occurs prior to assembling the refractory layer into the composite laminate. This cationic treatment provides enhanced stability to the refractory layer on exposure to fluids.

In some embodiments of this invention, the inorganic platelet layer is reinforced by a lightweight open weave fabric scrim either laid onto a single platelet layer or placed between two layers of platelets so as to provide additional mechanical strength to the layer. The scrim can be made from natural, organic or inorganic fibers with glass, cotton, nylon or polyester being typical examples. A glass fiber scrim is particularly preferred. The scrim may be a woven or knit structure and has a typical areal weight not exceeding 40 grams per square meter.

In some embodiments, the refractory layer is perforated to enhance bonding to an adhesive layer during subsequent processing. The extent of perforation is determined by experimentation. In order to prevent compromising flame barrier properties, an individual perforation should not exceed 2 millimeters in maximum dimension. In a preferable embodiment, individual perforations should be spaced at least 10 millimeters apart. The shape of the perforations is not critical, Suitable perforations include circles, squares, rectangles, ovals and chevrons.

Use of the Multilayered Sheet

The refractory layer of the multilayered sheet may be removed from the release paper and used as a component in a flame barrier layer for a thermal insulation and acoustic blanket. An example of such a blanket is described in United States patent application publication 2011/0094826.

Test Methods

The wet tensile strength of the release paper was measured according to TAPPI T456 om-10 Tensile Breaking Strength of Water-saturated Paper and Paperboard ("Wet Tensile Strength").

The dry tensile strength of the release paper was measured according to TAPPI T494 om-06 Tensile Properties of Paper and Paperboard (Using Constant Rate of Elongation Apparatus).

The surface smoothness of the release paper was measured according to TAPPI T538 om-08 Roughness of Paper and Paperboard (Sheffield Method), The surface release value of the release paper was measured according to ASTM D1876-08 Standard Test Method for Peel Resistance of Adhesives (T-Peel Test).

The thickness of the release paper was measured by TAPPI T411 om-10 Thickness (Caliper) of Paper, Paperboard, and Combined Board.

The density of the release paper is a calculated value based on the measured values of release paper thickness and basis weight.

The air permeability of the release paper was measured according to TAPPI T460 om-11 Air Resistance of Paper (Gurley Method, sec/100 cc, 20 oz, cyL).

The dimensional stability of the release paper was rated based on its ability to hold flat (i.e. no moisture related wrinkles or creases) for at least 2 minutes when exposed to one-sided wetting.

The dry areal weight of the refractory layer was measured according to ISO 536 (1995) Determination of Grammage and TAPPI T 410 Grammage of Paper and Paperboard (Weight per Unit Area).

The moisture content of the refractory layer was measured according to ISO 287 (1985) Determination of Moisture Content-Oven Drying Method.

EXAMPLES

In the following examples, all parts and percentages are by weight and all degrees in centigrade unless otherwise indicated. Examples prepared according to the current invention are indicated by numerical values. Control or Comparative Examples are indicated by letter The vermiculite used was a high solids version of an aqueous dispersion of Microlite® 963 having an as supplied solids content of 7.5 percent. The dispersion was obtained from W.R. Grace and Co, Cambridge, Mass.

Comparative Example A

Vermiculite dispersion concentrated to a solids content of 10.6 weight percent was coated on 2-mil thick metalized polyester film using a slot die coating system to form a refractory layer on the film. The film was metalized on one side. The coating was applied to the metalized side of the film. The film was obtained under the tradename Mylar from E.I. DuPont de Nemours and Co., Wilmington, Del. The coated film was dried in an oven at a temperature not exceeding 110 degrees C. until the inorganic refractory layer had moisture content below 5%. The total drying time exceeded 75 minutes comprising a staged drying of 15 minutes at 60 degrees, 15 minutes at 71 degrees, 15 minutes at 82 degrees, 15 minutes at 93 degrees, and over 15 minutes at 99 degrees. The refractory layer had a dry coat weight of 35 gsm. The paper and refractory layers were wound up on separate rolls.

From inspecting a sample of the two layer composite, it was observed that the dried refractory layer spontaneously peeled away from the metalized side of the film. Peel characteristics were good.

Comparative Example B

This was as Example A except that the refractory layer had a dry coat weight of 19 gsm and the drying time was 45 minutes.

Comparative Example C

Vermiculite dispersion concentrated to a solids content of 13 weight percent was coated on a 6 micron thick polyetheretherketone (PEKK) film using a slot die coating system to form a refractory layer on the film. The film was grade DS-E obtained from Cytec Industries, Woodland Park, N.J. The coated film was dried in an oven at a temperature not exceeding 110 degrees C. until the inorganic refractory layer had moisture content below 5%. The drying time exceeded 45 minutes comprising a staged drying of 9 minutes at 71 degrees, 6 minutes at 82 degrees, 6 minutes at 93 degrees, and 25 minutes at 96 degrees. The refractory layer had a dry coat weight of 33 gsm. The two layer composite of film and refractory layer was wound up on a roll.

The coating process proved to be very difficult due to tendency for the film to wrinkle and crease. Further, the film had to be surface treated by a process such as corona treatment to promote wetting and give a uniform coating. A uniform and continuous refractory layer coating was not obtained. The refractory layer was also affected by streaks and light spots related to excessive air bubbles trapped in the high viscosity solution.

Comparative Example D

Vermiculite dispersion concentrated to a solids content of 7.5 weight percent was coated on 0.5 mil thick polyimide film using a knife over roll coating system to form a refractory layer on the film. The film was obtained under the tradename Kapton from E.I. DuPont de Nemours and Co., Wilmington, Del. The coated film was dried in an oven at a temperature not exceeding 110 degrees C. until the inorganic refractory layer had moisture content below 5%. The drying time exceeded 75 minutes comprising a staged drying of 20 minutes at 71 degrees, 20 minutes at 82 degrees, 20 minutes at 93 degrees, and over 25 minutes at 96 degrees. The refractory layer had a target dry coat weight of 33 gsm. The two layer composite of film and refractory layer was wound up on a roll.

The coating process proved to be very difficult due to tendency for the film to wrinkle and crease. Further, the film had to be surface treated by a process such as corona treatment to promote wetting and give a uniform coating, A uniform and continuous refractory layer coating was not obtained. The drying time of over 75 minutes was unacceptable.

Comparative Example E

Vermiculite dispersion concentrated to a solids content of 10.8 weight percent was coated on 2 mil thick polyimide (Kapton®) film using a slot die coating system to form a refractory layer on the film. The coated film was dried in an oven at a temperature not exceeding 110 degrees C. until the inorganic refractory layer had moisture content below 5%. The drying time exceeded 75 minutes comprising a staged drying of 9 minutes at 71 degrees, 6 minutes at 82 degrees, 6 minutes at 93 degrees, and 60 minutes at 96 degrees. The refractory layer had a dry coat weight of 33 gsm. The two layer composite of film and refractory layer was wound up on a roll.

Once dried to below 5% moisture content, a very uniform and continuous refractory layer resulted. The layer remained on the surface of the film with enough adhesion to allow for smooth roll winding and post-processing. The refractory layer was easily peeled off the base with a help of a reinforcing substrate that was bonded to the exposed side of the refractory layer. With extreme care it was possible to peel the refractory layer from the coating base as a stand alone film. However the drying time in excess of 75 minutes was too long to be of practical value.

Comparative Example F

This was as Example A except that the film layer did not have a metalized surface. The findings were the same as for Comparative Example E.

Comparative Example G

Vermiculite dispersion concentrated to a solids content of 10.8 weight percent was coated on 5 mil thick brown Kraft paper using a slot die coating system to form a refractory layer on the paper. The paper comprised about 100 weight percent cellulose and was obtained from Crocker Technical Papers, Fitchburg, Mass. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 33 gsm. The two layer composite of paper and refractory layer was wound up on a roll.

The refractory layer coating on 5 mil Kraft paper was smooth at the time of deposition but the paper started wrinkling and creasing as it absorbs water from the coating solution. With the coating paper being folded throughout the entire drying process, this resulted in a continuous but uneven film coating. There were also frequent paper breaks during the coating process that severely affected the productivity of the operation. This paper was deemed to be unsuitable.

Comparative Example H

Vermiculite dispersion concentrated to a solids content of 10.6% weight percent was coated on 5 mil thick meta-aramid paper using a slot die coating system to form a refractory layer on the paper. The paper was T413 grade Nomex® from DuPont. The paper had a basis weight of 1.23 oz/sq. yd., an average thickness of 4.9 mil, a density of 0.34 g/cc, a Gurley Air Resistance of 316 sec / 100cc, 20 oz. cyl., a smoothness of 325 Sheffield units, a dry tensile strength of 10.7 lb./in. in the machine direction and 5.5 lb./in. in the cross direction. The wet tensile strength was 5.1 lb./in. in the machine direction and 2.95 lb./in. in the cross direction. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 37 gsm. The two layer composite of paper and refractory layer was wound up on a roll.

Although the refractory material was successfully coated onto the paper it was impossible to remove refractory layer from the paper with out the aid of a reinforcing substrate that was bonded to the exposed side of the refractory film layer and even this could only be achieved with difficulty. This paper was deemed to be unsuitable for use.

Comparative Example J

Vermiculite dispersion was coated on 5.6 mil thick reinforced polyethylene sheet using a doctor blade. The polyethylene sheet was Tyvek® grade 1056D from DuPont. The coated sheet was dried in an oven at 90 degrees C. until the refractory layer had a moisture content below 5%. The drying time was 30 minutes. The dry basis weight of the refractory layer was 37 gsm.

The dried refractory layer could not be removed for the release sheet even with the help of a reinforcing substrate bonded to the exposed side of the refractory layer. Cohesive bond failure within the refractory layer was observed. The polyethylene sheet was unsuitable for use.

Example 1

Vermiculite dispersion concentrated to a solids content of 10.8% weight percent was coated on 5 mil thick hydrophilic gray RagKraft paper using a slot die coating system to form a refractory layer on the paper. The paper comprised a blend of 50 weight percent of cellulose fibers and 50 weight percent of cotton fibers and was obtained from Crocker Technical Papers. The paper had a basis weight of 4.0 oz/sq. yd., an average thickness of 5.1 mil, a density of 1.05 g/cc, a Gurley Air Resistance of 1087 sec / 100cc, 20 oz. cyl., a smoothness of 81 Sheffield units, a dry tensile strength of 64.3 lb/in. in the machine direction and 25.4 lb./in. in the cross direction. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees. The refractory layer had a dry coat weight of 33 gsm. The two layer composite of film and refractory layer was wound up on a roll.

The refractory layer coating on the 5-mil gray RagKraft paper was smooth at the time of deposition but paper tended to wrinkle and crease as it absorbed water from the coating solution. Continuity of the overall coating process was considered to be satisfactory with only occasional paper breaks. The paper was deemed to be at the low end of satisfactory. The drying time was considerably shorter than for Comparative Examples A and B.

Example 2

Vermiculite dispersion concentrated to a solids content of 10.8% weight percent was coated on 5 mil thick hydrophilic gray RagKraft paper using a slot die coating system to form a refractory layer on the paper. The paper comprised a blend of 47.5 weight percent of cellulose fibers, 47.5 weight percent of cotton fibers and 5 weight percent of polyethyleneterephthalate (PET) wet strength fiber. The paper was obtained from Crocker Technical Papers. The paper had a basis weight of 4.0 oz/sq. yd., an average thickness of 5.1 mil, a density of 1.05 g/cc, a Gurley Air Resistance of 1087 sec / 100 cc, 20 oz. cyl., a smoothness of 81 Sheffield units, a dry tensile strength of 64.3 lb/in. in the machine direction and 25.4 lb./in. in the cross direction. The wet tensile strength was 14.8 lb./in. in the machine direction and 5.5 lb./in. in the cross direction. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees The refractory layer had a dry coat weight of 33 gsm. The two layer composite of film and refractory layer was wound up on a roll.

The refractory layer coating on the 5-mil gray RagKraft paper was smooth at the time of deposition. Compared to Comparative Example H, there were fewer wrinkles and creases as it absorbed water from the coating solution. The refractory layer was continuous but somewhat uneven. Continuity of the overall coating process was considered to be excellent without any paper breaks. The paper was deemed to be satisfactory. The drying time was considerably shorter than for Comparative Examples A and B.

Example 3

Vermiculite dispersion concentrated to a solids content of 10.8% weight percent was coated on 9.5 mil thick hydrophilic gray RagKraft paper using a slot die coating system to form a refractory layer on the paper. The paper comprised a blend of 50 weight percent of cellulose fibers and 50 weight percent of cotton fibers and was obtained from Crocker Technical Papers. The paper had a basis weight of 6.4 oz/sq. yd., an average thickness of 9.6 mil, a density of 0.9 g/cc, a Gurley Air Resistance of 572 sec/100 cc, 20 oz. cyl., a smoothness of 128 Sheffield units, a dry tensile strength of 93.0 lb/in. in the machine direction and 35.6 lb./in. in the cross direction. The wet tensile strength was 6.98 lb./in. in the machine direction and 2.5 lb./in. in the cross direction. The coated paper was dried for 15 minutes in an air flotation oven at a temperature not exceeding 110 degrees C. until the inorganic refractory layer had moisture content below 5%. Differential drying temperatures were applied to the top (vermiculite side) and the bottom (release paper side). The drying profile on the top side was 5 minutes at 49 degrees, 5 minutes at 60 degrees and 5 minutes at 71 degrees. The drying on the bottom side was maintained for 15 minutes at 99 degrees The refractory layer had a dry coat weight of 33 gsm. The two layer composite of film and refractory layer was wound up on a roll.

Once dried to below 5% moisture content, a very uniform and continuous refractory layer resulted. The layer remained on the surface of the film with enough adhesion to allow for smooth roll winding and post-processing. The refractory layer was easily peeled off the base with a help of reinforcing substrate that was bonded to the exposed side of the refractory layer. With extreme care, it was also possible to peel the refractory layer from the paper as a stand alone film. The paper exhibited satisfactory overall dimensional stability even when wetted. Although edges of the wetted paper still showed some tendency to curl, a continuous and very smooth and uniform film coating was achieved. Continuity of the overall coating process was excellent without any paper breaks. The paper was deemed to be satisfactory.

Example 4

Example 4 was as per Example 2 except that the coating paper was 9.5 mil thick. The paper had a basis weight of 6.4 oz/sq. yd., an average thickness of 9.6 mil, a density of 0.9 g/cc, a Gurley Air Resistance of 572 sec/100 cc, 20 oz. cyl., a smoothness of 128 Sheffield units, a dry tensile strength of 93.0 lb/in. in the machine direction and 35.6 lb./in. in the cross direction. The wet tensile strength was 6.98 lb./in. in the machine direction and 2.5 lb./in. in the cross direction.

Once dried to below a 5% moisture content, a very uniform and continuous refractory film resulted. The film stayed on the surface of the coating paper with enough adhesion to allow for smooth roll winding and post-processing. The coating of the refractory layer on the 9.5-mil gray RagKraft paper was smooth at the time of deposition. The paper exhibited satisfactory overall dimensional stability even when wetted, with almost no tendency for the edges to curl, thus resulting in a continuous, very smooth and uniform refractory layer coating. Continuity of the overall coating process was excellent without any paper breaks. The paper was deemed to be satisfactory.

The refractory layer was easily peeled off the release paper base with a help of reinforcing substrate that was bonded to the exposed side of the refractory film. With extreme care it was also possible to peel short sections of the refractory layer from the paper without the aid of a reinforcing substrate.

Example 5

This was as per Example 3 except that an 11 mil thick paper was used. The paper had a basis weight of 8.1 oz/sq. yd., an average thickness of 11.0 mil, a density of 1.0 g/cc, a Gurley Air Resistance of 714 sec / 100 cc, 20 oz. cyl., a smoothness of 103 Sheffield units, a dry tensile strength of 122.0 lb/in. in the machine direction and 40.0 lb./in. in the cross direction. The wet tensile strength was 6.4 lb./in. in the machine direction and 2.5 lb./in. in the cross direction. The findings were the same as for Example 3

Example 6

This was similar to Example 5 except that, after coating and drying, the 33 gsm refractory layer on a release paper was treated, at ambient conditions, with an aqueous cationic rich solution.

The coated release paper was immersed for one minute in a cation rich solution of sodium chloride dispersed in water at 0.5N concentration then air dried at 24 degrees C. for 2 minutes followed by additional drying for 30 minutes inside a conventional oven heated to 80 degrees C.

Once dried to about 3% moisture content, the cation treated material was removed from the oven. Excess dry sodium chloride that had accumulated on the outer surfaces of the refractory layer and the release paper was carefully wiped off with a dry soft cloth.

When compared to a non-cation treated refractory layer, the cation treated layer showed a significantly improved stability when exposed to either high humidity conditions for a prolonged time such as 120 hours inside an aging chamber at 80 degrees C. and 90% RH or after immersion in water for at least 10 minutes. Other findings were similar to those of Example 5.

What is claimed is:

1. A multilayered sheet comprising a release paper having a first and a second outer surface and an inorganic refractory layer adjacent to at least one surface of the release paper wherein the inorganic refractory layer has a dry areal weight of from 15 to 50 gsm and a residual moisture content of no greater than 10 percent by weight, wherein the release paper
    (i) comprises a blend of cellulose and cotton fibers,
    (ii) is hydrophilic
    (iii) has a wet tensile strength of at least 5 lb/in in a first direction and at least 2 lb/in in a second direction, the second direction being transverse to the first direction,
    (iv) has a dry tensile strength of at least 10 lb/in in a first direction and at least 5 lb/in in a second direction, the second direction being transverse to the first direction,
    (v) has a surface smoothness on at least one outer surface of no greater than 150 Sheffield units,
    (vi) has a surface release value from at least one outer surface of from 0.25 to 1.5 lb/in,
    (vii) has a thickness of from 5 to 12 mil,
    (viii) has a density of from 0.9 to 1.1 g/cc, and
    (ix) has an air permeability no greater than 1200 Gurley Air Resistance (sec/100cc, 20 oz. cyl.).

2. The multilayered sheet of claim 1 wherein the inorganic refractory layer comprises vermiculite.

3. The multilayered sheet of claim 2 wherein the inorganic refractory layer further comprises cations.

4. The multilayered sheet of claim 1 wherein the release paper further comprises up to 5 weight percent of a dimensional stability promoting additive.

5. The multilayered sheet of claim 4 wherein the dimensional stability promoting additive is micro-glass, fiberglass or polyethylene.

6. The multilayered sheet of claim 1 wherein the release paper is thermally stable at 150 deg C for at least 10 minutes.

7. The multilayered sheet of claim 1 wherein the refractory layer has a dry areal weight of from 20 to 35 gsm.

8. The multilayered sheet of claim 1 wherein the refractory layer has a residual moisture content of no greater than 3 percent by weight.

9. The multilayered sheet of claim 1 wherein the release paper has a dry tensile strength of from 60 to 90 lb/in in a first direction and from 20 to 40 lb/in in a second direction, the second direction being transverse to the first direction.

10. The multilayered sheet of claim 1 wherein the release paper has a surface smoothness on at least one outer surface of from 60 to 80 Sheffield units.

11. The multilayered sheet of claim 1 wherein the release paper has a thickness of from 9 to 11 mil.

12. The multilayered sheet of claim 1 wherein the release paper has an air permeability of 300 to 700 Gurley Air Resistance (sec/100cc, 20 oz. cyl.).

\* \* \* \* \*